March 9, 1926.

H. F. MARANVILLE 1,575,925

APPARATUS FOR APPLYING FLIPPER STRIPS TO TIRE BEAD CORES

Filed Jan. 12, 1922　　2 Sheets-Sheet 1

Inventor

Harvey F. Maranville

Witness

H. A. Thomas

By Spear Middleton Donaldson & Hall

Attorney

March 9, 1926.  1,575,925
H. F. MARANVILLE
APPARATUS FOR APPLYING FLIPPER STRIPS TO TIRE BEAD CORES
Filed Jan. 12, 1922  2 Sheets-Sheet 2
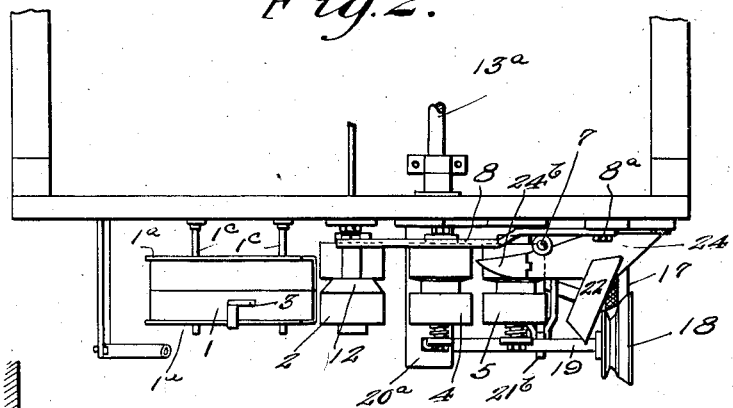
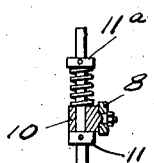
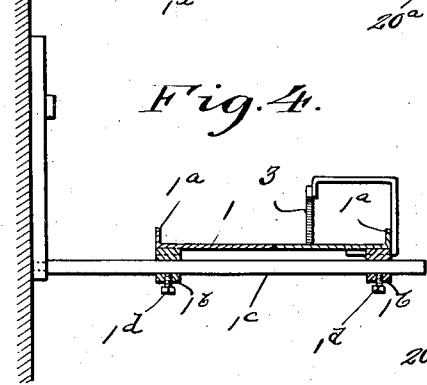
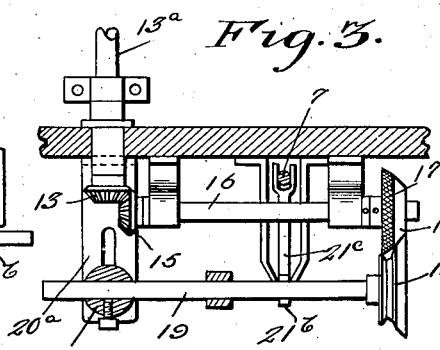
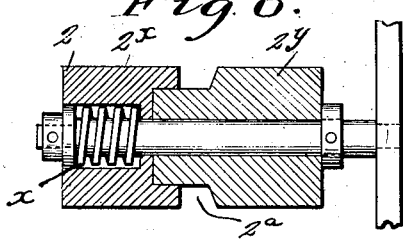
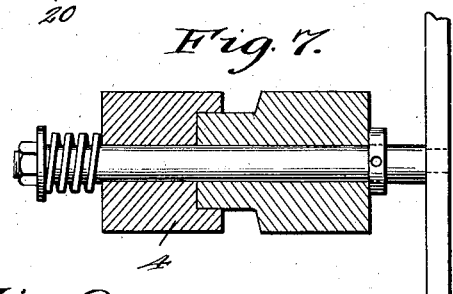
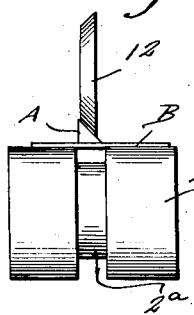
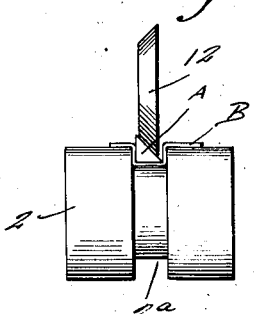
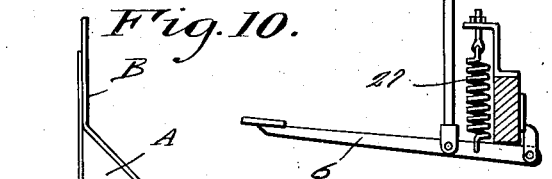
Witness
R. O. Thomas
Inventor
Harvey F. Maranville
By Spear Middleton Donaldson & Hall
Attorney Patented Mar. 9, 1926.

1,575,925

UNITED STATES PATENT OFFICE.

HARVEY F. MARANVILLE, OF AKRON, OHIO, ASSIGNOR TO THE MILLER RUBBER COMPANY, OF AKRON, OHIO, A CORPORATION OF OHIO.

APPARATUS FOR APPLYING FLIPPER STRIPS TO TIRE BEAD CORES.

Application filed January 12, 1922. Serial No. 528,746.

*To all whom it may concern:*

Be it known that I, HARVEY F. MARANVILLE, a citizen of the United States, and a resident of Akron, in the county of Summit and State of Ohio, have invented certain new and useful Improvements in Apparatus for Applying Flipper Strips to Tire Bead Cores, of which the following is a specification.

My present invention relates to improvements in apparatus designed for use in the manufacture of pneumatic tire shoes or casings. Such shoes or casings have embodied in the edges thereof reinforcing bead cores which, in the case of what are known as Q D or straight side tires, are in the form of endless rings of rubber coated wire, wound or formed into (usually) substantially triangular shape in cross section, and cemented and dried in a tacky condition.

It has been customary to apply to these beads what are known to the trade as "flipper strips", which are bands of bias friction fabric folded around the bead so as to leave a double flap or skirt designed to be embodied in the side walls of the tire carcass to provide a strong anchorage for the bead cores.

Heretofore, so far as I am aware, these "flipper strips" have been applied by hand, which is a tedious operation requiring considerable skill and care and a material amount of time on the part of the workman, who must be a skilled operator.

The present invention aims to provide a machine or apparatus for applying such strips to the cores in a rapid and accurate manner, and the invention comprises the novel arrangement and combination of parts hereinafter described, the nature and scope of my invention being defined by the appended claims.

An embodiment of my invention is illustrated in the accompanying drawings, in which:—

Fig. 2 is a plan view, and

Fig. 3 is a sectional detail showing the rollers 17—18 and their supporting shafts.

Fig. 4 is a sectional view of the feed guide.

Fig. 5 is a detail view of the operating treadle and its connections.

Figure 1:
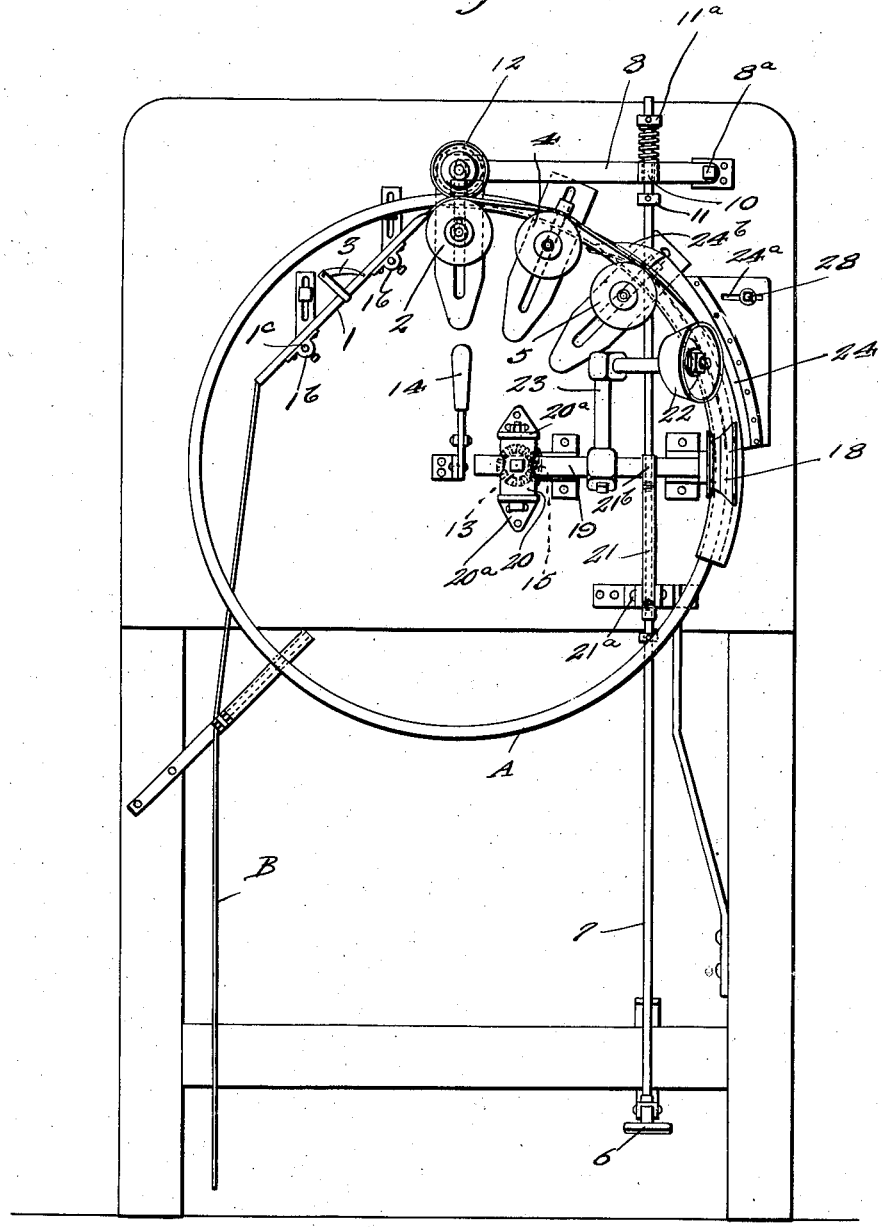
Figure 1 is a side elevation of an apparatus embodying my invention.

Figs. 6 and 7 are sectional detail views of rolls 2 and 4.

Figs. 8 and 9 are detail views of roll 2, showing in the first the covering strip and bead before being pressed into the roll groove, and in the latter, after being so pressed, and Fig. 10 is a detail view (in cross section) of the core with the strip applied thereto.

Referring by reference characters to these drawings, A designates the bead core, and B the strip of fabric which cooperated therewith, being shown in Fig. 10 in applied position on the bead core. This strip is introduced or fed to the machine by having one end portion thereof applied to a guide 1, preferably inclined as shown, which has its upper end located adjacent, and substantially tangential to, the periphery of a supporting roll 2, journaled upon a fixed axis. The guide 1 is preferably composed of two parts having flanged outer edges 1ª (see Fig. 4) said parts being adjustable towards and from each other to accommodate varying widths of strips according to the size of tire under construction.

This adjustment may conveniently be secured by providing the sections on their under sides with lugs or bracket members 1ᵇ having openings which engage supporting rods 1ᶜ carried by the main frame of the machine, being clamped in any desired position by the set screws 1ᵈ. A gravity retaining finger or pawl 3 is provided to prevent the fabric strip from slipping down the guide (Fig. 1).

The roll 2 has an annular centrally arranged groove 2ª which is of substantially rectangular shape in cross section, and corresponds in width to the inner face of the annular bead core.

The end of the strip to be applied having been passed onto the upper portion of the roll 2, and the ring shaped bead core A having been hung thereon and resting on the fabric strip in alignment with the annular groove 2ª, said bead core is then pressed down into the groove, carrying with it the center portion of the fabric strip, by the action of the roll 12, which has a beveled or inclined face corresponding to the inclined face of the bead core, as shown in Figs. 8 and 9. This is accomplished in the following manner:

A treadle lever 6 located in position convenient to the operator is connected to the lower end of a vertical rod 7, slidably guided by the machine frame, which rod is yieldingly connected at its upper end with a rocking arm 8 fulcrumed at 8ª upon a fixed pivot carried by the machine frame, the rod being preferably connected to the arm by being passed through a member 10 (Fig. 5) swiveled to arm 8 and being provided with an adjustale stop collar 11 beneath member 10 and a similar member 11ª above, a spring encircling the rod between collar 11ª and member 10, as shown.

Lever arm 8 carries at its free end a roller 12 which is located in the same plane as the annular groove 2ª in the roller 2, and said rollers 12 has its periphery shaped to conform to the outer surface of the bead core or ring.

Pressure having been applied to the treadle 6 by the operator, the roll 12 will be forced down against the bead ring or bead core A (Fig. 8) pressing the latter and the underlying fabric into the annular groove in the roll 2 which thereby causes the fabric to be shaped around the inner face of the bead core and to adhere thereto (Fig. 9) and, the bead ring being caused to revolve or travel in the manner hereinafter described, the fabric will be drawn forward and progressively applied to the bead core until one entire revolution has been made.

Succeeding the rolls 2 and 12 are a plurality (preferably two) of idle guide rolls 4 and 5, the three rolls being arranged on the arc of a circle corresponding to the size of the bead core. All three rolls are preferably mounted so as to be radially adjustable conveniently by having the stub shafts on which they are mounted clamped in radially arranged guideways in the machine frame, this adjustment being for the purpose of adapting the machine to varying sizes of bead rings.

Rotary movement is imparted to the bead ring or core by a pair of coacting rolls 17 and 18 (Figs. 1 and 3) the former being fast on a shaft 16 journaled in stationary bearings in the machine frame. Shaft 16 carries fast thereon a bevel gear 15 which meshes with a bevel gear 13 fast on a drive shaft 13ª driven from any convenient source of power and controlled by a suitable clutch (not shown) operated by clutch lever 14.

Roll 17 constitutes the feeding roll and for this purpose is provided with a knurled or roughened periphery, and roll 18 is an idle roll mounted to be movable towards and from the roll 17. To this end it is journaled on a swinging rod or bar 19 carried by the member or hub 20 pivotally mounted or journaled on a vertical axis between the bracket members 20ª carried by the machine frame.

One arm 21 of a bell crank lever fulcrumed at 21ª has a fork 21ᵇ engaging the bar or rod 19, while the other arm 21ᶜ of the bell crank is connected with the treadle rod 7 by a yielding connection, as shown in Fig. 5. A spring 27 tends to keep the treadle lever raised and hence rolls 12 and 18 separated from rolls 2 and 17 respectively to allow removal and replacement of the articles operated on.

It will be understood that after the bead and fabric strip have been caused to adhere by the coacting rolls 2 and 12, which action starts the margins of the strips, or flaps, in an outward direction, the folding action must be completed and the two margins or flaps brought together. For this purpose, I provide a guide 24 and cooperating roller 22. Guide 24 is adjustably secured to the machine frame by means of bolt 28 passing through slot 24ª and has a plow portion 24ᵇ which gradually picks up one of the flaps and brings it from a horizontal to an inclined position. Roll 22 is of substantially truncated cone or flaring shape and is rotatably mounted on a stub shaft carried by arm 23 which in turn is adjustably carried by rod or member 19, so that rolls 22, and 18 will both be moved into and out of active position simultaneously by the movement of the treadle lever. After the two flaps have been swung towards each other by the action of roll 22 and guide 24, the completion of the folding is effected by the rolls 17 and 18, the former of which has a substantially truncated cone shape and a surface of a width corresponding to the width of bead and one flap, and the latter an annular groove corresponding in shape to the cross section of the bead, the remaining portion of the roll being flared to correspond to the flare of roll 17. Preferably I only knurl the portion of roll 17 which corresponds to or cooperates with the bead portion, as indicated at 17ª, whereby the feed is exerted entirely upon the bead and the flaps relieved of any longitudinal strain.

It will be observed that roll 22 is mounted so as to work tangent to the surface of the bead so that it operates on the bias fabric with a stitching action.

It will further be observed that rolls 2, 4 and 5 are preferably so constructed that the walls of the grooves are automatically yieldable so as to accommodate them to variations in widths of beads. This is accomplished by making each roll of two sections, as illustrated in Figs. 6 and 7, wherein it will be seen that the two sections $2^x$ and $2^y$ are mounted upon the stub shaft, the section $2^x$ having a reduced portion entering a corresponding recess in the other, the sections being pressed together by a spring $x$.

Having thus described my invention, what I claim is:—

1. Apparatus for applying fabric strips to bead core rings, comprising a roll having a rectangular bead ring receiving groove, means for feeding a fabric over said roll with a bead ring superposed thereon, and a presser member having an inclined face for cooperating with the inclined face of the bead ring for pressing said ring and the underlying fabric into the groove.

2. In apparatus for applying fabric strips to bead core rings, a roll comprising two sections, one having a cylindrical recess in one end and the other a cylindrical projection fitting said recess, and a spring holding said projection yieldably in said recess.

3. Apparatus for applying fabric strips to bead core rings, comprising a roller having a bead ring receiving groove, means for feeding a fabric strip thereto, a movably mounted roller for progressively pressing a superposed bead ring and the underlying strip into said groove, a pair of deflecting devices for deflecting the margins of the strip radially outward, one of said deflecting devices including a stationary deflector and the other a cooperating presser roller, and a pair of devices for subsequently pressing said margins together.

4. Apparatus for the purpose described, comprising an idle roller having an annular groove, a presser roll movable towards and from the same, a deflector, an idle roller movable towards and from the same, a feed roller with means for driving it, and an idle roller movable towards and from the same, and means for moving said two last named idle rollers in unison.

5. Apparatus for applying fabric strips to bead core rings, comprising cooperating means for progressively supporting and applying a fabric strip to a ring and folding it radially thereabout, and roller means for engaging the bead ring fabric and margins and progressively pressing said margins together and drawing the bead and strip through said applying and folding means, said roller means comprising a power driven roller having a knurled periphery and a cooperating roller having an annular groove aligning with the knurling of the power driven roller.

6. Apparatus for applying fabric strips to bead core rings, comprising cooperating means for progressively supporting and applying a fabric strip to a ring and folding it radially thereabout, and roller means for engaging the bead ring fabric and margins and progressively pressing said margins together and drawing the bead and strip through said applying and folding means, said roller means comprising a pair of rollers of substantially truncated cone shape, one of said rollers being a power driven roller having a knurled annular portion and a plain annular adjoining portion, and the other roll having an annular ring receiving groove aligning with said knurled portion and an adjoining annular plain portion cooperating with said first named plain portion.

In testimony whereof, I affix my signature.

HARVEY F. MARANVILLE.